(12) United States Patent
Gilmartin et al.

(10) Patent No.: US 7,624,187 B1
(45) Date of Patent: Nov. 24, 2009

(54) METHOD, SYSTEM AND COMPUTER PROGRAM PRODUCT FOR PROVIDING ETHERNET VLAN CAPACITY REQUIREMENT ESTIMATION

(75) Inventors: Neil Gilmartin, Atlanta, GA (US); Steven Allan Wright, Roswell, GA (US)

(73) Assignee: AT&T Intellectual Property, I, L.P., Wilmington, DE (US)

( * ) Notice: Subject to any disclaimer, the term of this patent is extended or adjusted under 35 U.S.C. 154(b) by 1104 days.

(21) Appl. No.: 10/667,009

(22) Filed: Sep. 19, 2003

(51) Int. Cl.
*G06F 15/16* (2006.01)

(52) U.S. Cl. .................. 709/229; 709/201; 709/202; 709/203

(58) Field of Classification Search ........... 709/226
See application file for complete search history.

(56) References Cited

U.S. PATENT DOCUMENTS

| | | |
|---|---|---|
| 4,926,418 A | 5/1990 | Cidon et al. |
| 5,216,591 A | 6/1993 | Nemirovsky et al. |
| 5,684,800 A | 11/1997 | Dobbins |
| 5,774,876 A | 6/1998 | Woolley et al. |
| 5,804,810 A | 9/1998 | Woolley et al. |
| 5,825,772 A | 10/1998 | Dobbins |
| 5,867,494 A | 2/1999 | Krishnaswamy et al. |
| 5,867,495 A | 2/1999 | Elliott et al. |
| 5,892,441 A | 4/1999 | Woolley et al. |
| 5,946,308 A | 8/1999 | Dobbins |
| 5,949,788 A * | 9/1999 | Friedman et al. ............ 370/431 |
| 5,959,568 A | 9/1999 | Woolley |
| 5,979,757 A | 11/1999 | Tracy et al. |
| 5,999,525 A | 12/1999 | Krishnaswamy et al. |
| 6,044,075 A | 3/2000 | Le Boudec et al. |
| 6,084,528 A | 7/2000 | Beach et al. |
| 6,092,113 A * | 7/2000 | Maeshima et al. ............ 709/230 |
| 6,104,701 A | 8/2000 | Avargues |

(Continued)

OTHER PUBLICATIONS

IEEE Standards for Local and Metropolitan Area Networks: Virtual Bridge Local Area Networks, LAN MAN Standards Committee of the IEEE Computer Society, Dec. 8, 1998, 34p, IEEE Std 802.1q-1998, The Institute of Electrical and Electronics Engineers, New York, New York, United States of America.

(Continued)

*Primary Examiner*—Kenny S Lin
*Assistant Examiner*—Hieu T Hoang
(74) *Attorney, Agent, or Firm*—Cantor Colburn LLP

(57) ABSTRACT

A method for providing Ethernet VLAN capacity requirement estimation. The method includes receiving a VLAN that contains VLAN access ports, VLAN switches and VLAN trunks. The VLAN access ports include VLAN bandwidth requirements and VLAN class of service. The VLAN trunks include VLAN capacity counters and VLAN threshold parameters. A target access port is received from a requestor, the target access port includes a target class of service and a target bandwidth requirement. A target trunk and target switch corresponding to the target access port are determined. The target trunk corresponds to one of the VLAN trunks and the target switch corresponds to one of the VLAN switches. A bandwidth contribution of the target access port to the VLAN is calculated. The calculating is responsive to the VLAN trunks, the VLAN switches, the VLAN access ports and the target access port. The bandwidth contribution is then transmitted to the requester.

15 Claims, 3 Drawing Sheets

U.S. PATENT DOCUMENTS

| | | | |
|---|---|---|---|
| 6,112,251 | A | 8/2000 | Rijhsinghani |
| 6,147,995 | A | 11/2000 | Dobbins |
| 6,151,324 | A * | 11/2000 | Belser et al. ................ 370/397 |
| 6,199,753 | B1 | 3/2001 | Tracy et al. |
| 6,208,649 | B1 | 3/2001 | Kloth |
| 6,335,927 | B1 | 1/2002 | Elliott et al. |
| 6,363,319 | B1 | 3/2002 | Hsu |
| 6,374,307 | B1 | 4/2002 | Ristau et al. |
| 6,377,551 | B1 | 4/2002 | Luo et al. |
| 6,522,641 | B1 | 2/2003 | Siu et al. |
| 6,550,672 | B1 | 4/2003 | Tracy et al. |
| 6,597,214 | B1 | 7/2003 | Singh et al. |
| 6,631,019 | B1 | 10/2003 | Vujkovic-Cvijin et al. |
| 6,633,573 | B1 | 10/2003 | Ben-Zur et al. |
| 6,681,232 | B1 | 1/2004 | Sistanizadeh et al. |
| 6,687,339 | B2 | 2/2004 | Martin |
| 6,690,848 | B2 | 2/2004 | Graves et al. |
| 6,697,793 | B2 | 2/2004 | McGreevy |
| 6,721,728 | B2 | 4/2004 | McGreevy |
| 6,731,625 | B1 | 5/2004 | Eastep et al. |
| 6,731,832 | B2 | 5/2004 | Alvarez et al. |
| 6,741,615 | B1 | 5/2004 | Patwardhan et al. |
| 6,741,981 | B2 | 5/2004 | McGreevy |
| 6,754,174 | B1 | 6/2004 | Ben-Zur et al. |
| 6,754,181 | B1 | 6/2004 | Elliott et al. |
| 6,763,025 | B2 | 7/2004 | Leatherbury et al. |
| 6,778,498 | B2 * | 8/2004 | McDysan ................... 370/231 |
| 6,804,199 | B1 | 10/2004 | Kelly et al. |
| 6,912,232 | B1 * | 6/2005 | Duffield et al. ............. 370/468 |
| 6,914,905 | B1 | 7/2005 | Yip |
| 6,963,575 | B1 * | 11/2005 | Sistanizadeh et al. ....... 370/404 |
| 6,976,087 | B1 | 12/2005 | Westfall et al. |
| 7,028,083 | B2 | 4/2006 | Levine et al. |
| 7,092,389 | B2 * | 8/2006 | Chase et al. ................ 370/389 |
| 7,185,077 | B1 | 2/2007 | O'Toole et al. |
| 2001/0003833 | A1 | 6/2001 | Tomizawa et al. |
| 2002/0031142 | A1 * | 3/2002 | Metin et al. ................. 370/463 |
| 2002/0042274 | A1 | 4/2002 | Ades |
| 2002/0054595 | A1 * | 5/2002 | Ambe et al. ................ 370/390 |
| 2002/0110087 | A1 | 8/2002 | Zelig et al. |
| 2002/0120727 | A1 | 8/2002 | Curley et al. |
| 2002/9129727 | | 8/2002 | Curley et al. |
| 2002/0126690 | A1 * | 9/2002 | Narayana et al. ............ 370/444 |
| 2002/0191250 | A1 * | 12/2002 | Graves et al. ................ 359/128 |
| 2003/0067928 | A1 | 4/2003 | Gonda |
| 2003/0149788 | A1 | 8/2003 | Saint Etienne et al. |
| 2003/0169694 | A1 | 9/2003 | Seaman |
| 2003/0172188 | A1 * | 9/2003 | Hasegawa et al. ........... 709/249 |
| 2004/0042416 | A1 * | 3/2004 | Ngo et al. ................... 370/254 |
| 2004/0058652 | A1 * | 3/2004 | McGregor et al. ....... 455/67.13 |
| 2004/0062198 | A1 * | 4/2004 | Pedersen et al. ............. 370/229 |
| 2004/0081180 | A1 * | 4/2004 | De Silva et al. ............. 370/402 |
| 2004/0098500 | A1 * | 5/2004 | Liu et al. ..................... 709/232 |
| 2004/0103282 | A1 * | 5/2004 | Meier et al. ................. 713/171 |
| 2004/0105459 | A1 | 6/2004 | Mannam |
| 2004/0146006 | A1 * | 7/2004 | Jackson ...................... 370/230 |
| 2004/0196790 | A1 * | 10/2004 | Balakrishnan et al. ...... 370/232 |
| 2004/0210623 | A1 | 10/2004 | Hydrie et al. |
| 2004/0221042 | A1 * | 11/2004 | Meier ......................... 709/227 |
| 2004/0246976 | A1 * | 12/2004 | Balakrishnan et al. . 370/395.41 |
| 2004/0249916 | A1 * | 12/2004 | Graves et al. ............... 709/223 |
| 2005/0021766 | A1 * | 1/2005 | McKeowen et al. ......... 709/228 |
| 2005/0027851 | A1 * | 2/2005 | McKeown et al. .......... 709/224 |
| 2005/0066036 | A1 | 3/2005 | Gilmarting et al. |
| 2005/0122983 | A1 | 6/2005 | Gilmartin et al. |
| 2006/0013231 | A1 | 1/2006 | Matthews et al. |
| 2006/0062211 | A1 | 3/2006 | Manthoulis et al. |

OTHER PUBLICATIONS

Martin, Richard P., et al. "Effects of Communication Latency, Overhead, and Bandwidth in a Cluster Architecture." University of California, Berkeley: Computer Science Division. International Symposium on Computer Architecture: pp. 85-97; 1997.

Fineburg, Victoria. "A Practical Architecture for Implementing End-to-End QoS in an IP Network." IEEE Communications Magazine: pp. 122-130. Jan. 2002.

U.S. Appl. No. 10/720,644, filed Nov. 24, 2003, Neil Gilmartin et al.

U.S. Appl. No. 10/666,069, filed Sep. 19, 2003, Neil Gilmartin.

Martin, Richard P., et al. "Effects of Communication Latency, Overhead, and Bandwidth in a Cluster Architecture." Computer Science Division, University of California, Berkeley, CA. Jun. 1997. pp. 85-97.

Fineberg, V. "Building a QoS Enabled IP Network: A Practical Architecture for Implementing End-to-End QoS in an IP Network." Lucent Technologies. IEEE Communications Magazine. pp. 122-130. Jan. 2002.

Kruse, James and Keith Ross, "Cross Networking, A Top-Down Approach Featuring the Internet", 2001, Addison Wesley Longman; Inc. pp. 280-281.

U.S. Appl. No. 10/866,011 CC Ref. No. BLL-0109-USP, Att Ref. No. 030206CIP, Titled: Methods, Systems and Computer Program Products for Facilitating the Design and Analysis of Virtual Networks Based on Total Hub Value.

* cited by examiner

METHOD, SYSTEM AND COMPUTER PROGRAM PRODUCT FOR PROVIDING ETHERNET VLAN CAPACITY REQUIREMENT ESTIMATION

FIELD OF THE INVENTION

The present disclosure relates generally to providing Ethernet VLAN capacity requirement estimation and in particular, to a method of utilizing a least contribution capacity algorithm for providing Ethernet VLAN capacity requirement estimation.

BACKGROUND OF THE INVENTION

Computer networks carry data between various devices. The data may be carried in connection-based links, such as the virtual circuits in an asynchronous transfer mode (ATM) network. Data may also be carried between devices in network segments where data is broadcast to all of a plurality of devices on the segment via a broadcast-type medium. An example of the latter is an Ethernet network. It is typically convenient to set up local area networks (LANs) using a broadcast type medium over which devices can share data.

In some circumstances, for example, where a LAN is required to connect devices that are geographically distant from one another, the LAN may be broken into separate segments. Within each segment devices (e.g., switches) can exchange data by way of a broadcast-type medium. The segments may be connected to one another by way of connection-based links such as physical transport lines. Such a LAN may be referred to as a virtual LAN (VLAN). The VLAN may be thought of as a logical web of connections over physical transports.

Metro-Ethernet networks are based on VLANs within the Ethernet network of a given metropolitan area. A VLAN is the interconnection of any number of access ports for a given customer within the larger service provider Ethernet network. Due to the nature of Ethernet VLANs as tree structures topologically, the calculation of the impact of any given port on the bandwidth (BW) of the underlying trunk network is complex since it depends not only on the BW of the port and the class of service (COS) of the VLAN, but also on the placement of the port within the context of the overall VLAN. Currently, expert technicians manage Ethernet VLANs manually. As VLANs become larger and include more complex (e.g., more COSs) it becomes more difficult and time consuming for technicians to take into account capacity considerations.

BRIEF DESCRIPTION OF THE INVENTION

Embodiments of the present invention include a method for providing Ethernet VLAN capacity requirement estimation. The method includes receiving a VLAN that contains VLAN access ports, VLAN switches and VLAN trunks. The VLAN access ports include VLAN bandwidth requirements and VLAN class of service. The VLAN trunks include VLAN capacity counters and VLAN threshold parameters. A target access port is received from a requester, the target access port includes a target class of service and a target bandwidth requirement. A target trunk and target switch corresponding to the target access port are determined. The target trunk corresponds to one of the VLAN trunks and the target switch corresponds to one of the VLAN switches. A bandwidth contribution of the target access port to the VLAN is calculated. The calculating is responsive to the VLAN trunks, the VLAN switches, the VLAN access ports and the target access port. The bandwidth contribution is then transmitted to the requestor.

Further embodiments of the present invention include a method for providing Ethernet VLAN capacity requirement estimation. The method includes receiving a VLAN and auditing the VLAN. Auditing the VLAN includes checking the VLAN for structural integrity and computing a capacity counter value associated with the VLAN. Auditing the VLAN also includes computing a hub value associated with the VLAN and checking capacity on a trunk associated with the VLAN. The method for providing Ethernet VLAN capacity requirement estimation also includes transmitting the results of the auditing.

Other embodiments of the present invention include a system for providing Ethernet VLAN capacity requirement estimation. The system includes a network and a storage device in communication with the network. The storage device includes a database of VLANs. The system further includes a user system in communication with the network and a host system in communication with the network. The host system includes application software to implement a method. The method includes receiving a VLAN stored in the VLAN database that contains VLAN access ports, VLAN switches and VLAN trunks. The VLAN access ports include VLAN bandwidth requirements and VLAN class of service. The VLAN trunks include VLAN capacity counters and VLAN threshold parameters. A target access port is received via the network from a requester on a user system, the target access port includes a target class of service and a target bandwidth requirement. A target trunk and target switch corresponding to the target access port are determined. The target trunk corresponds to one of the VLAN trunks and the target switch corresponds to one of the VLAN switches. A bandwidth contribution of the target access port to the VLAN is calculated. The calculating is responsive to the VLAN trunks, the VLAN switches, the VLAN access ports and the target access port. The bandwidth contribution is then transmitted to the requestor via the network.

Still further embodiments of the present invention include a computer program product for providing Ethernet VLAN capacity requirement estimation. The computer program product includes a storage medium readable by a processing circuit and stores instructions for execution by the processing circuit for facilitating a method that includes receiving a VLAN. The VLAN contains VLAN access ports, VLAN switches and VLAN trunks. The VLAN access ports include VLAN bandwidth requirements and VLAN class of service. The VLAN trunks include VLAN capacity counters and VLAN threshold parameters. A target access port is received from a requester, the target access port includes a target class of service and a target bandwidth requirement. A target trunk and target switch corresponding to the target access port are determined. The target trunk corresponds to one of the VLAN trunks and the target switch corresponds to one of the VLAN switches. A bandwidth contribution of the target access port to the VLAN is calculated. The calculating is responsive to the VLAN trunks, the VLAN switches, the VLAN access ports and the target access port. The bandwidth contribution is then transmitted to the requester.

Other systems, methods and/or computer program products according to embodiments will be or become apparent to one with skill in the art upon review of the following drawings and detailed description. It is intended that all such additional systems, methods, and/or computer program products be within the scope of the present invention, and be protected by the accompanying claims.

BRIEF DESCRIPTION OF THE DRAWINGS

Referring to the exemplary drawings wherein like elements are numbered alike in the several FIGURES.

DETAILED DESCRIPTION OF THE INVENTION

Exemplary embodiments of the present invention implement a least contribution algorithm for calculating the impact of any given port on the BW of the underlying trunk network, on a per port basis, in the context of provisioning VLANs. Provisioning decisions are made based on the result of applying the least contribution algorithm and counters are updated and/or alerts are generated. Exemplary embodiments of the present invention will calculate the impact of the addition (or removal) of a particular access port to a specified VLAN. Exemplary embodiments of the present invention may be utilized to provide an audit function of a VLAN by walking through each access port in the specified VLAN. For every existing link in the specified VLAN, appropriate alerts may be generated, counters updated and a pass or fail status communicated.

Exemplary embodiments of the present invention operate in the context of an operational support system that manages metro-Ethernet services. The operational support system may provide the context of network intelligence and capacity tracking counters and control parameter that govern the logic of the least contribution capacity algorithm. In exemplary embodiments of the present invention, the operational support system includes a database of existing VLANs such that the VLAN names are unique across the region, each existing VLAN has an accessible list of network elements already in the connection paths of that VLAN, and each VLAN has the counters to support a least contribution algorithm. In addition, each trunk includes capacity counters and threshold parameters that contain: the BW capacity of the trunk; the currently assigned BW in each COS category; and alarm and cutoff parameters that may be utilized by exemplary embodiments of the present invention to control further assignments to that trunk.

In exemplary embodiments of the present invention, the algorithm has as input a VLAN name, a COS, an access port and the BW of the port. The algorithm then examines every link relative to this access port, i.e., every link has a near end and a far end relative to this access port. Due to the tree structure of an Ethernet VLAN, all ports in the VLAN are on exactly one side or the other of each link. The algorithm can therefore be utilized to calculate the sum of all ports on each of the two sides of the link, or trunk, and then determine the overall impact of adding the access port. Taking the BW and COS of the port into account and the contribution of the port to the capacity load of the link, the algorithm verifies whether capacity is available for the port. If yes, it adjusts the counters appropriately and goes on to the next link. The least contribution algorithm may be utilized by exemplary embodiments of the present invention in the VLAN provisioning process to determine the impact on the existing VLAN link of adding (or removing) an access port on the VLAN. It will pass or fail the assignment and issue appropriate alarms.

Figure 1:
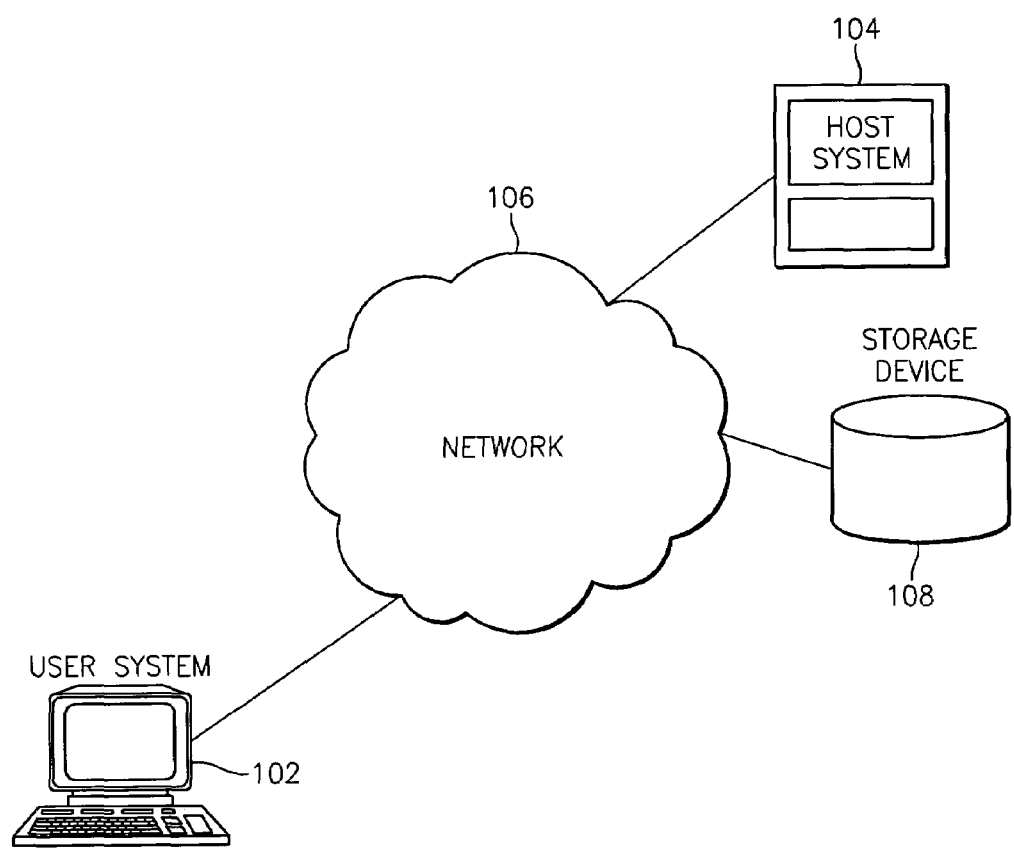
FIG. 1 is a block diagram of an exemplary system for providing Ethernet VLAN capacity requirement estimation in accordance with exemplary embodiments of the present invention.

FIG. 1 is a block diagram of an exemplary system for providing Ethernet VLAN capacity requirement estimation in accordance with exemplary embodiments of the present invention. The exemplary system includes a host system 104 for executing a least contribution algorithm and for setting counters and alarms. The system in FIG. 1 also includes one or more user systems 102 through which VLAN technicians located at one or more geographic locations may contact the host system 104 to initiate the execution of the Ethernet VLAN capacity requirement estimation application. The Ethernet VLAN capacity requirement estimation application includes calculating a least contribution algorithm, updating counters associated with the VLAN and transmitting alerts based on specified conditions. In exemplary embodiments of the present invention, the host system 104 executes the capacity requirement estimation application and the user system 102 is coupled to the host system 104 via a network 106. In alternate exemplary embodiments, the user system 102 is directly connected to the host system 104. Each user system 102 may be implemented using a general-purpose computer executing a computer program for carrying out the processes described herein. The user system 102 may be a personal computer (e.g., a lap top, a personal digital assistant) or a host attached terminal. If the user system 102 is a personal computer, the processing described herein may be shared by a user system 102 and the host system 104 (e.g., by providing an applet to the user system 102).

The network 106 may be any type of known network including, but not limited to, a wide area network (WAN), a local area network (LAN), a global network (e.g. Internet), a virtual private network (VPN), and an intranet. The network 106 may be implemented using a wireless network or any kind of physical network implementation known in the art. A user system 102 may be coupled to the host system through multiple networks (e.g., intranet and LAN) so that not all user systems 102 are coupled to the host system 104 through the same network. One or more of the user systems 102 and the host system 104 may be connected to the network 106 in a wireless fashion.

The storage device 108 depicted in FIG. 1 may be implemented using a variety of devices for storing electronic information. It is understood that the storage device 108 may be implemented using memory contained in the host system 104 or it may be a separate physical device. The storage device 108 is logically addressable as a consolidated data source across a distributed environment that includes a network 106. The physical data may be located in a variety of geographic locations depending on application and access requirements. Information stored in the storage device 108 may be retrieved and manipulated via the host system 104. The storage device 108 includes interim data utilized to perform the Ethernet VLAN capacity requirement estimation. In addition, the storage device 108 includes access to operational system support data such as a database of network elements and trunks, a database of existing VLANs and the network elements associated with the VLANs, and capacity data (e.g., counters for each COS) for the trunks and switches. The storage device 108 may also include other kinds of data such as information concerning the creation and update of the VLANs (e.g., date, time of creation/update and technician identification). In exemplary embodiments of the present invention, the host system 104 operates as a database server and coordinates access to application data including data stored on storage device 108. Access to data contained storage device 108 may be restricted based on user characteristics.

The host system 104 depicted in FIG. 1 may be implemented using one or more servers operating in response to a computer program stored in a storage medium accessible by the server. The host system 104 may operate as a network server (e.g., a web server) to communicate with the user system 102. The host system 104 handles sending and receiving information to and from the user system 102 and can perform associated tasks. The host system 104 may reside behind a firewall to prevent unauthorized access to the host system 104 and enforce any limitations on authorized access. A firewall may be implemented using conventional hardware and/or software as is known in the art.

The host system 104 may also operate as an application server. The host system 104 executes one or more computer programs to provide Ethernet VLAN capacity requirement estimation. One or more application programs within the host system 104 share information to support the capacity requirement estimation process. The processing of the capacity requirement estimation application may be shared by a user system 102 and the host system 104 by providing an application (e.g., a java applet) to the user system 102. As previously described, it is understood that separate servers may be utilized to implement the network server functions and the application server functions. Alternatively, the network server, the firewall, and the application server may be implemented by a single server executing computer programs to perform the requisite functions.

Figure 2:
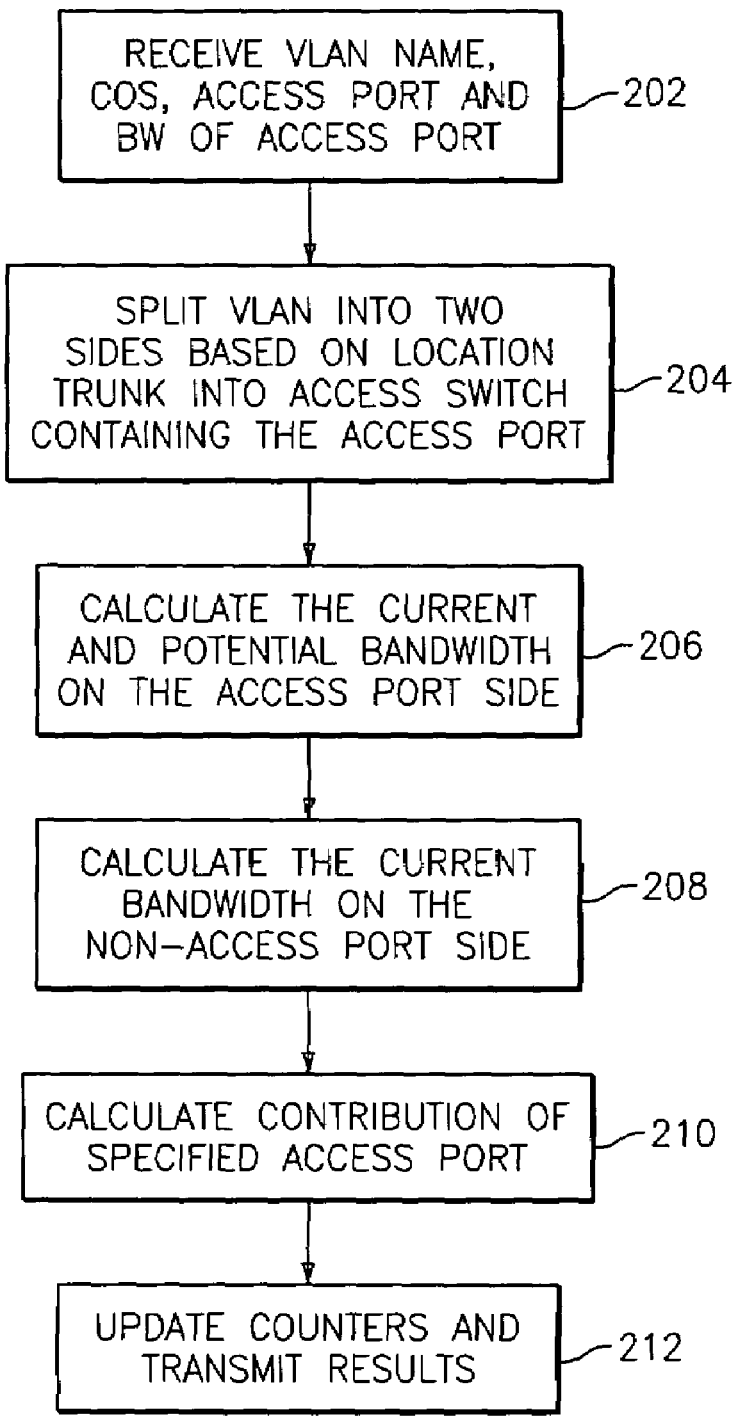
FIG. 2 is a flow diagram of an exemplary process for providing Ethernet VLAN capacity requirement estimation in accordance with exemplary embodiments of the present invention.

FIG. 2 is a flow diagram of an exemplary process for providing Ethernet VLAN capacity requirement estimation in accordance with exemplary embodiments of the present invention. At step 202, a VLAN name, COS, access port and the BW of the access port are received. Based on this input data, the VLAN data including the access ports, access switches, trunks and trunk counters are retrieved from an operational support system. At step 204, the VLAN is split into two sides based on the location of the trunk into the access switch containing the input access port. Exemplary embodiments of the present invention consider all trunks in the VLAN as having an "access port side" (the side closest to the access port being considered) and a "non-access port side" (the side farthest from this port being considered).

At step 206, the current and potential BW associated with the access port side is calculated. The current access port side total is the sum of all BW requirements entering the trunk from the switch at the access port side of the trunk. The potential access port side total is the sum of the current access port side total and the BW of the specified access port. Next, at step 208, the current BW associated with the non-access port side of the trunk is calculated as the total of the BW of all access ports on the non-access port side of the trunk. At step 210, the contribution of the specified access port is calculated in terms of a minimum required BW. The current minimum required BW may be calculated as the minimum of the current access port side total and the current non-access port side total. The potential minimum required BW may be calculated as the minimum of the potential access port side total and the current non-access port side total. The BW contribution of the specified access port is equal to the potential minimum required BW minus the current minimum required BW. The BW contribution of the specified access port is zero if the current minimum required BW is equal to the potential minimum required BW.

At step 212, the algorithm checks the capacity of the trunk to verify that the requested BW, or the BW contribution of the specified access port, for the requested COS is available. A pair of access switches may include several trunks between them to choose from for the requested BW. In exemplary embodiments of the present invention, the trunk that currently contains the highest utilization is selected by the algorithm as long as the selection does not cause the trunk to exceed capacity. Alternate exemplary embodiments may allow a technician to select the trunk that has the lowest utilization. If the assignment of the requested BW would cross the alarm, or alert, threshold for the specified COS on the trunk, an alarm is raised. If the assignment would cross the cutoff threshold for the specified COS on the trunk, an alarm is raised and the assignment is not allowed. Alarms, or alerts, may include sending an e-mail to alert an individual of the situation and/or sending the data to an operational system. The algorithm updates the capacity counters of each trunk and VLAN trunk as appropriate and returns an indication of whether the assignment is a pass or fail. If the assignment failed, then the links that have failed are also returned.

Alternate exemplary embodiments of the present invention may be utilized to perform audits on VLAN capacity to ensure that the required BW is being made available and to assess the likelihood of new trunks being required in the near future to support the VLAN. This may be performed by walking through each access port in the VLAN and assessing the capacity requirements. The audit may be utilized to verify that a VLAN that was designed manually includes enough capacity. Exemplary embodiments of the audit include: checking the hand designed VLAN for structural integrity (e.g., completeness, coherence, and tree structure); computing all capacity counters and hub values; and checking capacity on all trunks. Other alternate exemplary embodiments of the present invention may be utilized to update the VLAN and counters, if there is enough capacity, and to transmit any alerts and/or cut-off threshold data.

Figure 3:
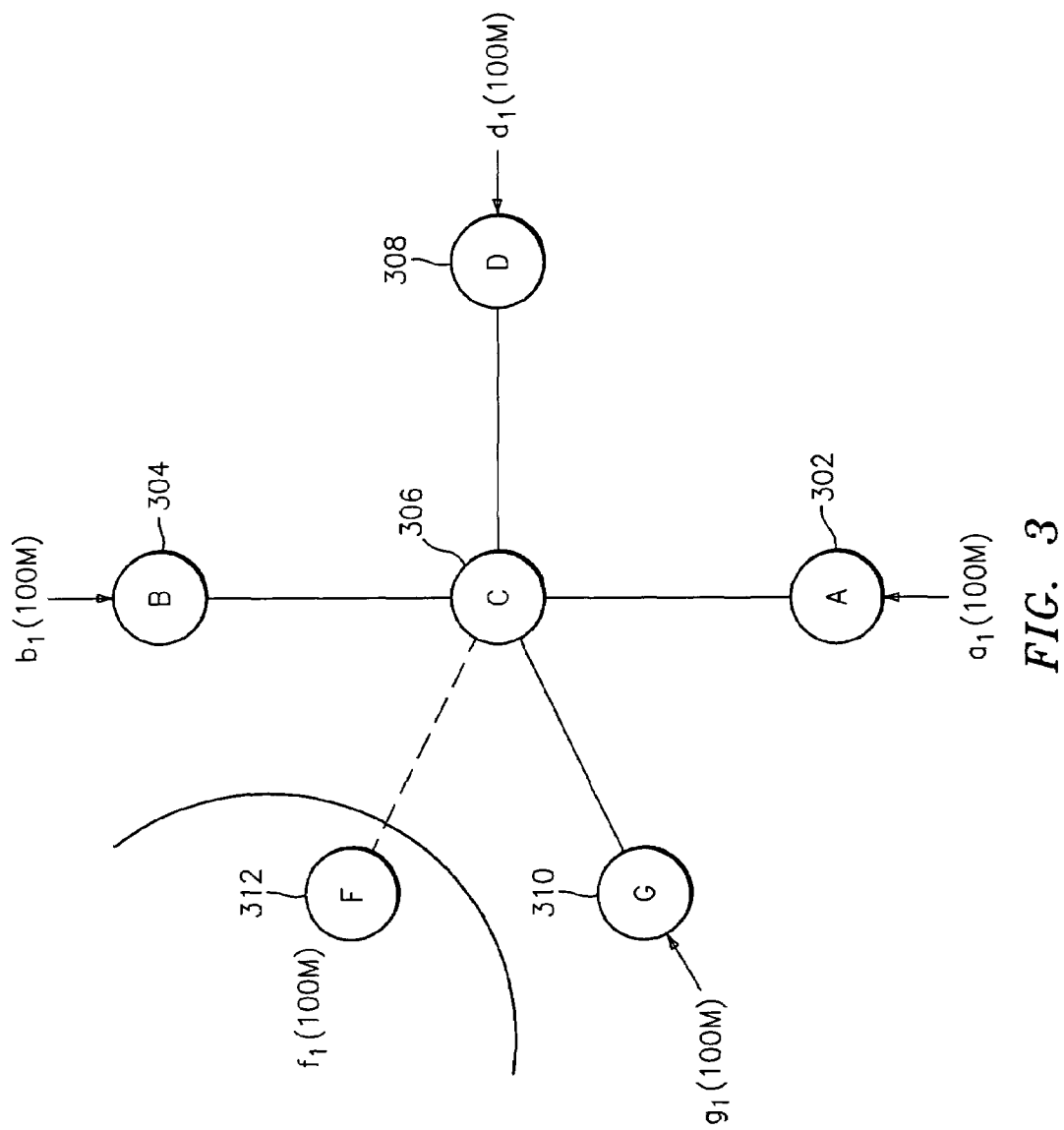
FIG. 3 is a block diagram of access switches and physical transport lines that may be utilized in exemplary embodiments of the present invention.

In the following example, the impact of an access port on the BW of an underlying trunk in a VLAN is calculated. The example is simplified to show how exemplary embodiments of the present invention may perform, however, a typical Ethernet VLAN may include twenty or more access ports. FIG. 3 is a block diagram of access switches, access ports and physical transport lines, or trunks, that may be utilized in exemplary embodiments of the present invention. The block diagram includes access switch A 302 with an access port "a1" that has a 100 megabyte (M) bandwidth requirement, access switch B 304 with an access port "b1" that has a 100 M bandwidth requirement, switch C 306, access switch D 308 with an access port "d1" that has a 100 M bandwidth requirement, access switch G 310 with an access port "g1" that has a 100 M bandwidth requirement, and access switch F 312 with an access port "f1" that has a 100 M bandwidth requirement.

The impact of a 100 M access port f1 at access switch F 312 is being calculated. In this example, the following data is received from the requestor or from the operational support systems: COS is best effort; the trunk connecting access switch F 312 to switch C 306 has the capacity to support a BW of 1000 M for the best effort COS; the current BW is 750 M and an alert should be generated when the BW passes 800 M. The VLAN, as depicted in FIG. 3, is retrieved from the operational support system based on the VLAN name received as input. The VLAN is split into two sides based on the location of the trunk into the access switch containing the input access port f1 (see step 204 in FIG. 2). The access port side includes the access switch F 312 and the "non-access port side" includes access switch G 310, access switch A 302, access switch D 308, access switch B 304 and switch C 306.

Next, the current and potential BW associated with the access port side is calculated (see step 206 in FIG. 2):

Current access port side total=0 (currently no BW required by the VLAN on switch F 312);

Potential access port side total=100M (100M from switch F 312).

Next, the current BW associated with the non-access port side of the trunk is calculated (see step 208 in FIG. 2):

Current non-access port side total=400 M (100M from switch B 304, 100M from switch D 308, 100M from switch A 302 and 100M from switch G 310 into switch C 306).

Then, the contribution of the specified access port is calculated in terms of a minimum required BW (see step 210 in FIG. 2):

Current minimum BW=MIN(0(current access port side total),400(current non-access port side total))=0;

Potential minimum BW=MIN(100(potential access port side total),400(current non-access port side total))=100;

Contribution of access port $f1$=100M(potential minimum BW)−0M (current minimum BW)=100M.

The algorithm then checks the capacity of the trunk to verify that the requested BW for the COS best effort is available (see step 212 in FIG. 2). The trunk currently has BW capacity of 1000M for the best effort COS and 750M is currently reserved. Therefore, there is room for the additional 100M which will bring the reserved level up to 850M, 50M over the alert condition. The algorithm will then send an alert (e.g., an e-mail) to notify the responsible party(s) of the condition. In addition, the algorithm will reserve the 100M on the trunk for connecting the access port f1.

Exemplary embodiments of the present invention assess the capacity requirements when an access port is added or removed from a VLAN. This may be performed prior to adding a new access port to ensure that enough capacity is available. In addition, exemplary embodiments of the present invention may be utilized to perform VLAN audits to determine if the trunks supporting a VLAN are reaching capacity limits. This ability to predict capacity impact and to audit a VLAN may lead to better VLAN performance because new trunk capacity may be added and/or the access port may be connected via a different trunk and thereby avoid performance degradation of the VLAN.

As described above, the embodiments of the invention may be embodied in the form of computer-implemented processes and apparatuses for practicing those processes. Embodiments of the invention may also be embodied in the form of computer program code containing instructions embodied in tangible media, such as floppy diskettes, CD-ROMs, hard drives, or any other computer-readable storage medium, wherein, when the computer program code is loaded into and executed by a computer, the computer becomes an apparatus for practicing the invention. Exemplary embodiments of the present invention can also be embodied in the form of computer program code, for example, whether stored in a storage medium, loaded into and/or executed by a computer, or transmitted over some transmission medium, such as over electrical wiring or cabling, through fiber optics, or via electromagnetic radiation, wherein, when the computer program code is loaded into and executed by a computer, the computer becomes an apparatus for practicing the invention. When implemented on a general-purpose microprocessor, the computer program code segments configure the microprocessor to create specific logic circuits.

While the invention has been described with reference to exemplary embodiments, it will be understood by those skilled in the art that various changes may be made and equivalents may be substituted for elements thereof without departing from the scope of the invention. In addition, many modifications may be made to adapt a particular situation or material to the teachings of the invention without departing from the essential scope thereof. Therefore, it is intended that the invention not be limited to the particular embodiment disclosed as the best mode contemplated for carrying out this invention, but that the invention will include all embodiments falling within the scope of the appended claims. Moreover, the use of the terms first, second, etc. do not denote any order or importance, but rather the terms first, second, etc. are used to distinguish one element from another.

What is claimed is:

1. A method for providing Ethernet VLAN capacity requirement estimation, said method comprising:
   receiving a VLAN including VLAN access ports, VLAN switches and VLAN trunks, wherein said VLAN access ports include VLAN bandwidth requirements and VLAN class of service and said VLAN trunks include VLAN capacity counters and VLAN threshold parameters;
   receiving a target access port, said target access port including a target class of service and a target bandwidth requirement from a requester;
   determining a target trunk and target switch corresponding to said target access port, wherein said target trunk corresponds to one of said VLAN trunks and said target switch corresponds to one of said VLAN switches;
   calculating a bandwidth contribution of said target access port to said VLAN, said calculating responsive to said VLAN trunks, said VLAN switches, said VLAN access ports, and said target access port; and
   transmitting said bandwidth contribution to said requester;
   wherein said calculating a bandwidth contribution of said target access port to said VLAN includes:
   splitting said VLAN into two portions based on the location of said VLAN switches relative to said target trunk, wherein one portion includes said target access port and is an access port side and the other portion is a non-access port side;
   calculating a current access port side bandwidth requirement responsive to said VLAN;
   calculating a potential access port side bandwidth requirement responsive to said VLAN and to said target access port;
   calculating a current non-access port bandwidth requirement responsive to said VLAN; and
   determining said bandwidth contribution of said target access port by subtracting the minimum of said current access port side bandwidth requirement compared to said current non-access port bandwidth requirement from the minimum of said potential access port side bandwidth requirement compared to said current non-access port bandwidth requirement.

2. The method of claim 1 further comprising:
   adding said bandwidth contribution to a target capacity counter corresponding to said target trunk resulting in a target capacity;
   transmitting an alert in response to said target capacity exceeding a target threshold corresponding to said target trunk.

3. The method of claim 2 wherein said target threshold is an alarm threshold.

4. The method of claim 2 wherein said target threshold is a cut-off threshold.

5. The method of claim 2 further comprising updating said target capacity counter with said target capacity and adding said target access port to said VLAN in response to said target capacity not exceeding said target threshold.

6. The method of claim 2 wherein said target threshold varies based on said target class of service.

7. The method of claim 2 wherein said target capacity varies based on said target class of service.

8. The method of claim 1 wherein said target class of service is best effort.

9. The method of claim 1 wherein said target class of service is committed bandwidth.

10. The method of claim 1 wherein said target class of service is priority plus.

11. A system for providing Ethernet VLAN capacity requirement estimation, the system comprising:
   a storage device storing a VLAN database;
   a host system in communication with said storage device; and said host system in communication with a user system via a network, said host system including application software to implement a method comprising:
   receiving a VLAN stored in said VLAN database, said VLAN including VLAN access ports, VLAN switches and VLAN trunks, wherein said VLAN access ports include VLAN bandwidth requirements and VLAN class of service and said VLAN trunks include VLAN capacity counters and VLAN threshold parameters;
   receiving a target access port via said network, said target access port including a target class of service and a target bandwidth requirement from a requestor using said user system;
   determining a target trunk and target switch corresponding to said target access port, wherein said target trunk corresponds to one of said VLAN trunks and said target switch corresponds to one of said VLAN switches;
   calculating a bandwidth contribution of said target access port to said VLAN, said calculating responsive to said VLAN trunks, said VLAN switches, said VLAN access ports, and said target access port; and
   transmitting said bandwidth contribution via said network to said requestor;
   wherein said calculating the bandwidth contribution of said target access port to said VLAN includes:
   splitting said VLAN into two portions based on the location of said VLAN switches relative to said target trunk, wherein one portion includes said target access port and is an access port side and the other portion is a non-access port side;
   calculating a current access port side bandwidth requirement responsive to said VLAN;
   calculating a potential access port side bandwidth requirement responsive to said VLAN and to said target access port;
   calculating a current non-access port bandwidth requirement responsive to said VLAN; and
   determining said bandwidth contribution of said target access port by subtracting the minimum of said current access port side bandwidth requirement compared to said current non-access port bandwidth requirement from the minimum of said potential access port side bandwidth requirement compared to said current non-access port bandwidth requirement.

12. The system of claim 11 wherein said network is the Internet.

13. The system of claim 11 wherein said network in an intranet.

14. The system of claim 11 wherein said VLAN database is a relational database.

15. A computer program product for providing Ethernet VLAN capacity requirement estimation, the computer program product comprising:
   a storage medium readable by a processing circuit and storing instructions for execution by the processing circuit for facilitating a method comprising:
   receiving a VLAN including VLAN access ports, VLAN switches and VLAN trunks, wherein said VLAN access ports include VLAN bandwidth requirements and VLAN class of service and said VLAN trunks include VLAN capacity counters and VLAN threshold parameters;
   receiving a target access port, said target access port including a target class of service and a target bandwidth requirement from a requester;
   determining a target trunk and target switch corresponding to said target access port, wherein said target trunk corresponds to one of said VLAN trunks and said target switch corresponds to one of said VLAN switches;
   calculating a bandwidth contribution of said target access port to said VLAN, said calculating responsive to said VLAN trunks, said VLAN switches, said VLAN access ports, and said target access port; and
   transmitting said bandwidth contribution to said requester;
   wherein said calculating the bandwidth contribution of said target access port to said VLAN includes:
   splitting said VLAN into two portions based on the location of said VLAN switches relative to said target trunk, wherein one portion includes said target access port and is an access port side and the other portion is a non-access port side;
   calculating a current access port side bandwidth requirement responsive to said VLAN;
   calculating a potential access port side bandwidth requirement responsive to said VLAN and to said target access port;
   calculating a current non-access port bandwidth requirement responsive to said VLAN; and
   determining said bandwidth contribution of said target access port by subtracting the minimum of said current access port side bandwidth requirement compared to said current non-access port bandwidth requirement from the minimum of said potential access port side bandwidth requirement compared to said current non-access port bandwidth requirement.

* * * * *